No. 637,874. Patented Nov. 28, 1899.
B. F. KENNA.
APPARATUS FOR APPLYING VEHICLE TIRES.
(Application filed Mar. 6, 1899.)
(No Model.) 4 Sheets—Sheet 1.
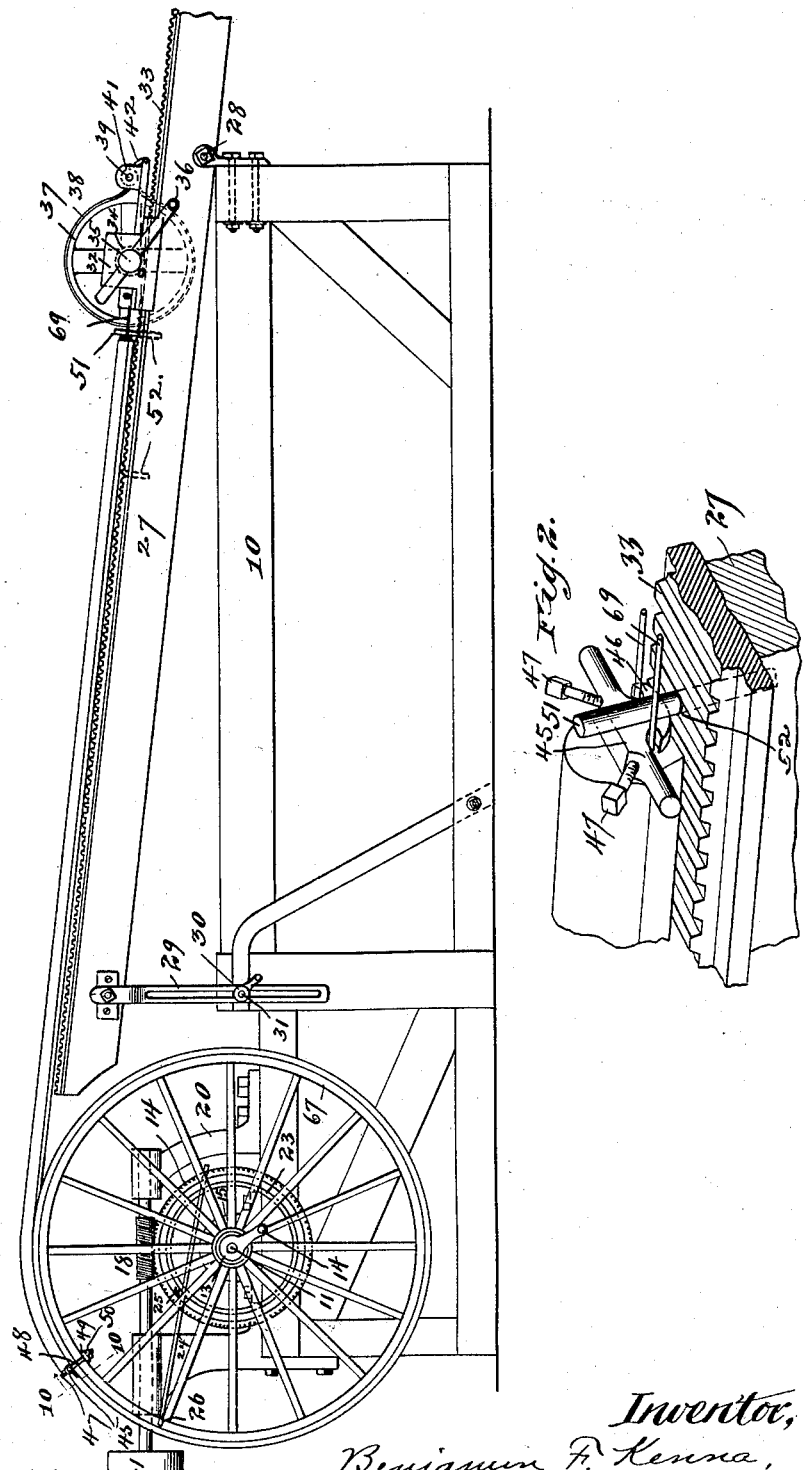
Witnesses,
Inventor,
Benjamin F. Kenna,
By Offield, Towle & Linthicum,
Attys.

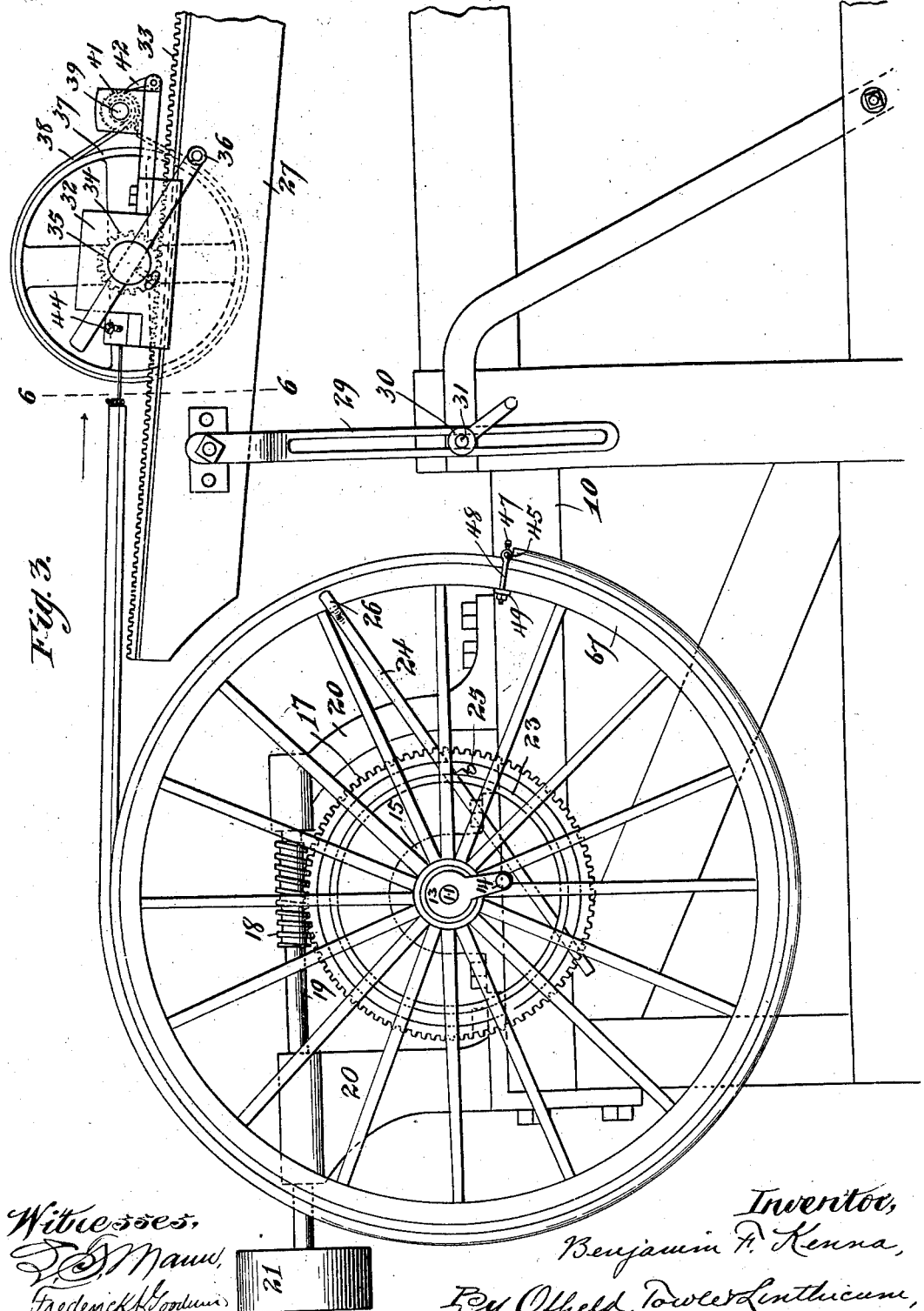

No. 637,874. Patented Nov. 28, 1899.
B. F. KENNA.
APPARATUS FOR APPLYING VEHICLE TIRES.
(Application filed Mar. 6, 1899.)
(No Model.) 4 Sheets—Sheet 3.
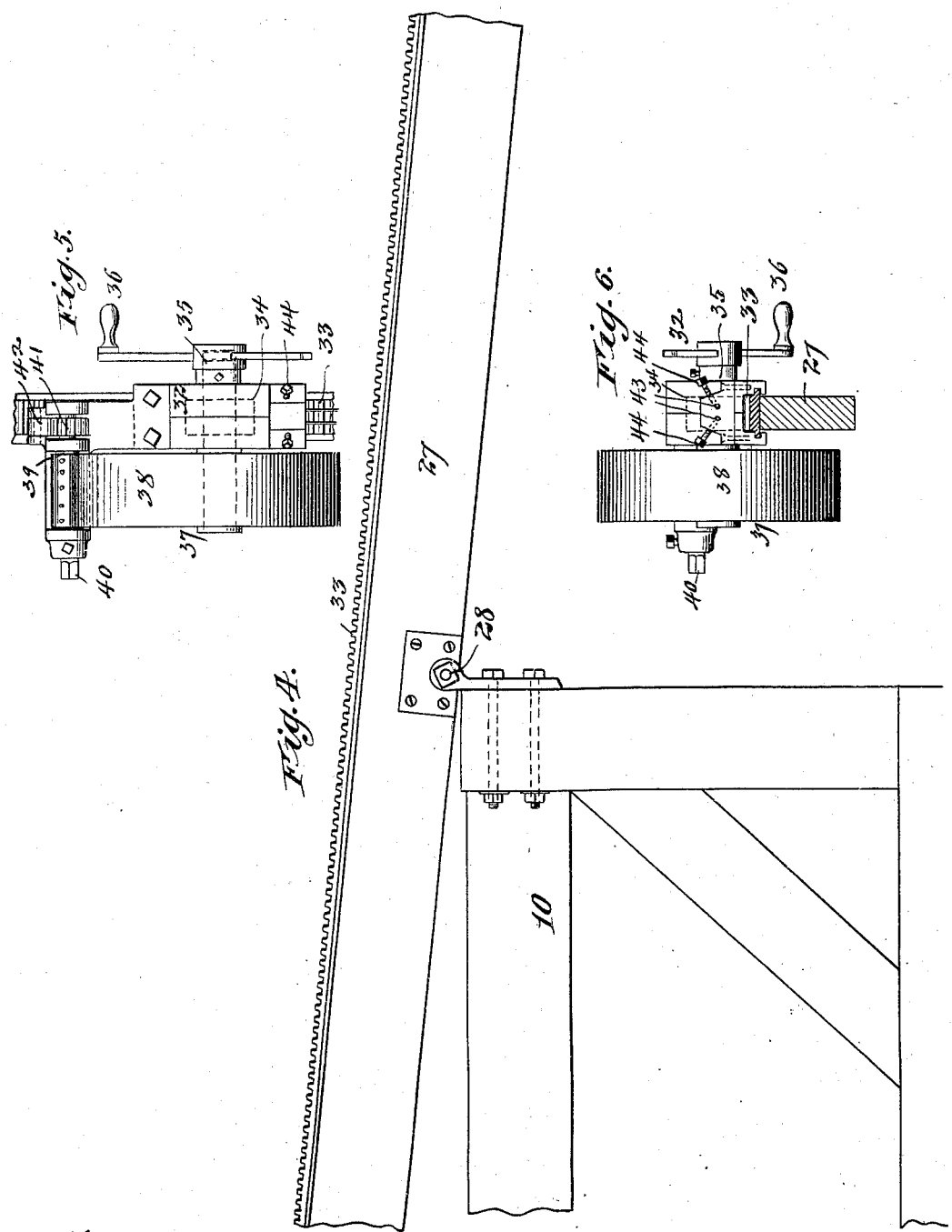

No. 637,874. Patented Nov. 28, 1899.
B. F. KENNA.
APPARATUS FOR APPLYING VEHICLE TIRES.
(Application filed Mar. 6, 1899.)
(No Model.) 4 Sheets—Sheet 4.
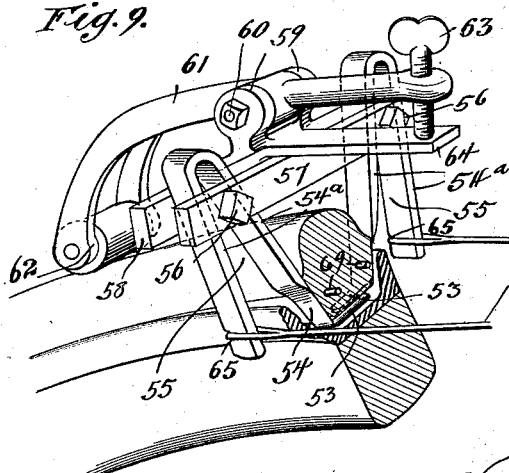
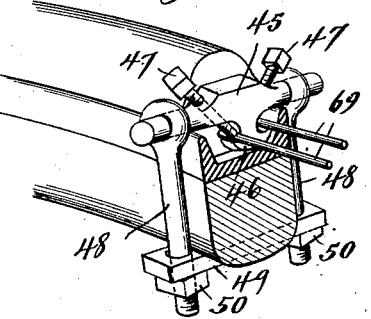
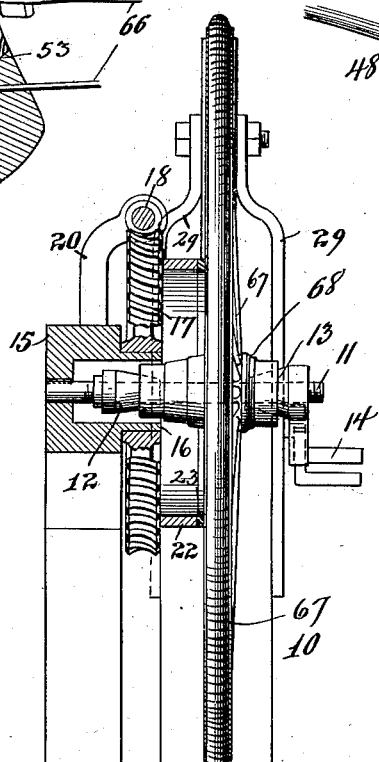
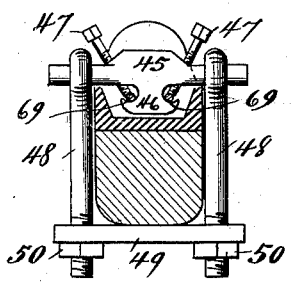

UNITED STATES PATENT OFFICE.

BENJAMIN F. KENNA, OF CHICAGO, ILLINOIS, ASSIGNOR TO HARVEY S. FIRESTONE, OF SAME PLACE.

APPARATUS FOR APPLYING VEHICLE-TIRES.

SPECIFICATION forming part of Letters Patent No. 637,874, dated November 28, 1899.

Application filed March 6, 1899. Serial No. 707,997. (No model.)

*To all whom it may concern:*

Be it known that I, BENJAMIN F. KENNA, of Chicago, in the county of Cook and State of Illinois, have invented certain new and useful Improvements in Apparatus for Applying Vehicle-Tires, of which the following is a specification.

This invention relates to apparatus for applying vehicle-tires, and has for its object to provide a mechanism whereby rubber vehicle-tires having wires passing longitudinally therethrough to form retaining devices may be applied to the channeled rims of the wheels for which they are intended prior to the joining, by brazing or otherwise, of the ends of said wires, the mode of application being such that the tire is firmly held in place in the rim with an even and equal tension applied to its retaining-wires, said tension being uniformly distributed during the application of the tire to the rim and the compression of the rubber of the tire being evenly and uniformly distributed.

To these ends the invention consists in certain novel features, which I will now proceed to describe and will then particularly point out in the claims.

In the accompanying drawings, Figure 1 is a side elevation of an apparatus embodying my invention, the same being shown with its parts in position for use in compressing the rubber upon the wires preliminary to applying the tire to the wheel. Fig. 2 is an enlarged detail perspective view of a portion of Fig. 1. Fig. 3 is an enlarged view of the left-hand portion of the apparatus, showing the parts in the position assumed by them during the operation of applying the tire to the rim of a wheel. Fig. 4 is a similar view of the remaining portion of the machine not shown in Fig. 3, the two Figs. 3 and 4 giving a complete side elevation of the machine. Fig. 5 is a detail plan view of the tension-carriage. Fig. 6 is a front elevation of the same, the said view being a sectional view upon the line 6 6 of Fig. 3 and looking in the direction of the arrow. Fig. 7 is an end elevation, partly in section, of the mechanism for holding and rotating the vehicle-wheel during the operation of placing the tire thereon. Fig. 8 is a detail perspective view in section through the wheel rim and felly, showing one of the clamps for securing the tire in place in the rim of the wheel. Fig. 9 is a similar view illustrating the device employed for equally distributing the compression of the rubber tire and bringing the end thereof together; and Fig. 10 is an enlarged detail sectional view taken on the line 10 10 of Fig. 1.

Heretofore in the application of wired-on rubber tires to vehicle-wheels it has been customary to join the ends of the wires, and thus complete the annular form of the tire before applying the tire to the wheel, the tire being placed in position by springing it into place after the joining of the ends. This method is objectionable, in that it tends to place an undue strain upon the retaining-wires, necessitating their being stretched sufficiently to materially increase their length and frequently causing breakage of the wires or their separation at the point of junction of their ends. It has also been proposed to place the tire in the rim before joining the ends of the wires thereof and to then draw these ends simultaneously toward each other to bring them into position to effect their junction by brazing or otherwise. This mode of operation is disadvantageous, in that the tension is not equally distributed throughout the whole tire, so that this latter is not evenly and firmly seated in the rim. I propose to remedy these disadvantages by an apparatus whereby one end of the tire may be secured to the rim, while the other end is attached to a tension device, means being provided for rotating the wheel, so that the tire is gradually laid in the channel of the rim under an equal tension at all times and in all parts, the ends being subsequently joined by brazing or in any other suitable manner. By means of this apparatus the undue strains brought upon the wires by the springing of the tire into position are avoided, while the tension of the tire is made uniform and equal throughout.

In carrying out my invention I employ the apparatus shown in the accompanying drawings, in which 10 indicates a suitable supporting-framework. This frame carries at one end means for supporting and rotating the vehicle-wheel to which the tire is to be applied. This comprises a stud or supporting-axle 11, which projects laterally from the frame and which is provided with centering and supporting devices consisting of two opposite cones 12 and 13, the outer one 13 of which is provided with a crank-handle 14, by means of which it may be quickly removed from and applied to and adjusted on the outer end of the stud or axle, which latter is threaded, as shown, to receive said cone, the cone being internally threaded to fit thereon. The inner cone 12 is also adjustable upon the stud, preferably by a similar screw-threaded connection, in order to adapt the apparatus to receive wheels having hubs of varying lengths.

Mounted upon the frame 10 is a bearing 15, to which in the present instance the stud 11 is shown secured, said bearing having a cylindrical portion 16 surrounding said stud and having mounted upon it a worm-wheel 17, which is adapted to be driven by a worm 18, carried by a shaft 19, mounted in bearings 20 on the frame 10 and having a driving-pulley 21 or other means whereby it may be rotated. This worm-wheel is provided with means for engaging and rotating the vehicle-wheel carried by the stud 11, and in the construction shown these means consist of an annular projection or flange 22, having a facing 23, of rubber or the like, to bear against the spokes of the wheel and by its frictional engagement therewith cause the vehicle-wheel to rotate along with the worm-wheel. As an additional device for this purpose I may employ a rod or bar 24, which is adjustably mounted in the annular flange 22 and secured in position after adjustment by a set-screw 25, said rod or bar having a yoke-shaped end 26, adapted to bear against the inner face of the felly of the vehicle-wheel adjacent to one of the spokes thereof, and thereby positively insure the rotation of the vehicle-wheel along with the worm-wheel.

In conjunction with the mechanism for supporting and rotating the vehicle-wheel I employ a tension device, preferably of the construction shown, in which 27 indicates a supporting-way which, in order to adapt the apparatus for use with wheels of varying diameter, is hinged to one end of the frame 10, as indicated at 28, and is adjustably supported at its other end by means of slotted bars 29, adapted to be clamped to the frame by means of hand-nuts 30, mounted on bolts 31, passing through the slots of said bars. The supporting-way 27 also constitutes a guideway on which travels a tension-carriage 32, and said way is provided with a rack 33, with which engages a pinion 34, carried by a shaft 35, mounted in the carriage 32. Said shaft 35 is provided at one end with a crank-handle 36, by means of which it may be rotated, and has at its other end a friction drum or pulley 37, around which passes a friction-band 38. One end of said band 38 is secured to the carriage, while the other end is secured to a tightening drum or shaft 39, provided with a wrench-grasp 40, by means of which it may be rotated to increase the friction between the friction-band and drum, and having a ratchet-wheel 41, adapted to be engaged by a pawl 42 to maintain said tension shaft or drum in any desired position to which it may be adjusted. The carriage 32 is provided at its forward end with clamping devices, by means of which the retaining-wires of the tire may be securely connected therewith, and in the present instance I have shown for this purpose apertures 43, into which the wires may be inserted and within which they may be firmly clamped by set or binding screws 44.

For the purpose of securing the wires in position upon the wheel-rim I employ two clamps constructed as shown in Figs. 8 and 10 of the drawings, and each comprising a transverse body portion 45 of greater length than the width of the wheel-rim, having centrally located on its under side seats 46 to receive the wires and set-screws 47, by means of which the wires may be firmly clamped in said seats. Eyebolts 48 are adapted to slip over the projecting ends of the body portion 45 and their lower ends pass through a clamping-plate 49 and are provided with clamping-nuts 50 below said plate. These clamps may be readily taken apart and assembled for the purpose hereinafter described, and in conjunction with one of them I employ a stop-pin 51, which may be inserted in any one of a number of apertures 52 in the supporting-way 27.

I also provide a mechanism (shown in Fig. 9 of the drawings) whereby after the tire has been applied to the rim of the vehicle-wheel and the ends of the retaining-wires have been joined the ends of the rubber may be brought together and the compression thereof equalized at the joint. In this structure I employ two lifting blades or plates 53, which are comparatively thin metallic blades having rounded or beveled edges and being of a length substantially equal to the width of the bottom of the channel of the metallic rim. The lower part of the shank of each of these blades is also comparatively thin and flat, as indicated at 54, and lies at an angle to the plate proper about equal to the angle of the flange of the rim to the bottom thereof. The remaining portion 54$^a$ of the shank is bent upon itself or otherwise shaped to form a slot 55, and these slots are adapted to receive clamping-bolts 56, the heads of which bear upon a clamping-plate 57, while their threaded ends take into apertures in a base-plate 58. This base-plate has on its upper edge lugs 59 to receive the axis 60 of a lever 61, carrying at its rear end a roller 62, which is adapted to bear upon the outer part of the rubber tire, while its forward end is threaded to receive an adjusting-screw 63, which bears upon a forward extension 64 from the base-plate 58. The ends of the shanks 54$^a$ are notched, as shown at 65, or otherwise adapted to have connected to them wires or other connecting devices 66, by means of which they may be connected with the carriage 32.

The apparatus, being constructed in the manner just described, is operated as follows:

The wheel 67 is mounted upon the stud 11 by inserting said stud through the opening in the hub 68 of the wheel, the cone 13 being removed for that purpose, and the cone 12 being adjusted to such a position as to furnish a bearing for the hub when the wheel has been brought up against the rubber-cushioned face of the annulus 22. The cone 13 is then screwed into place and forces the vehicle-wheel against the rubber face of the annulus 22, while the cones 12 and 13 form bearings upon which the wheel may turn. If desired, the rod or bar 24 may also be placed in position to insure the turning of the vehicle-wheel along with the worm-wheel. The retaining-wires (indicated at 69) are then placed through the apertures in the rubber tire, and one end of said tire is secured to the rim of the vehicle-wheel, as indicated in Figs. 1 and 3, by inserting the ends of the retaining-wires into the seats 46 of the clamp and securing them by means of the set-screws 47, whereupon the eyebolts 48 are slipped over the projecting ends of the body 45 on each side of the wheel-rim, and the entire device is clamped in place by passing the clamping-plate 49 over the threaded ends of the eyebolts and then screwing up the clamping-nuts 50 to hold the entire device firmly in position on the wheel. The rubber tire should then be compressed upon the wires in order to leave a sufficient amount projecting to insure the joining of the ends and at the same time insure the covering up of this joint after it has been made and the maintaining of the rubber in a compressed condition upon the wheel when in use. This compression has ordinarily been effected entirely by hand; but my improved apparatus provides means, as shown in Figs. 1 and 2, for effecting this compression mechanically. In carrying out this feature of my invention I place the body 45 of the second clamp upon the wires 69, but without clamping the wires by means of the set-screws 47. I then insert the stop-pin 51 in a hole 52, located on that side of the part 45 nearest to the carriage 32. The ends of the wires 69 are then firmly clamped to the carriage 32, being, in the construction shown, inserted into the apertures 43 provided for that purpose and there held by the set-screws 44. The parts are then in the position shown in Fig. 1 of the drawings, and by rotating the crank-handle 36 the pinion 35 will, by its engagement with the rack 33, move the carriage 32 along the way 27 away from the vehicle-wheel, carrying along with it the wires 69. The rubber, however, is prevented from moving along with the wires by reason of the bearing of the part 45 against its end, said part being held stationary by the stop-pin 51, so that the rubber is compressed upon the wires to any desired extent. During this operation the vehicle-wheel is of course left free to revolve. When the rubber has been sufficiently compressed, the part 45 of the clamp is firmly connected to the wires by screwing in the set-screws 47, thereby holding the rubber in a compressed condition upon the wires until said set-screws are released, and leaving a sufficient portion of said wires projecting to permit them to be joined to the projecting portions at the other end of the tire after the tire has been placed in the rim. It will be understood, of course, that the way 27 is adjusted at its end adjacent to the vehicle-wheel to a height corresponding to the size of wheel operated upon. The shaft 39 is then turned in order to cause the friction-band 38 to bear upon the friction-drum 37 with the desired tension, and the vehicle-wheel is then rotated by means of the mechanism provided for that purpose, gradually winding the tire and its wires around the periphery of the wheel and seating them in the channel of the rim thereof, and during this operation the carriage 32, by reason of the friction band and drum thereon, exercises a constant and equal tension upon the said tire and its wires and insures its being laid in the channel of the rim under equal tension as to all parts thereof. This tension may of course be adjusted by the means provided for that purpose in order to adapt it to varying conditions and sizes of tire and wheel. When the tire has made approximately a complete revolution and the end thereof adjacent to the carriage is in the rim, with the part 45 immediately above the same, the eyebolts 46 are slipped over the projecting ends of said part, the clamping-plate 49 is applied to the lower ends of said eyebolts, and the nuts 50 are screwed up, thereby securing the second end of the tire to the wheel. The projecting portions of the wire may then be cut off to the exact length and shape required either before or after removing them from the carriage 32, and the two sets of projecting ends may then be brought into proper position relatively to each other for joining by brazing or in any other suitable manner. This operation completed the clamps are removed, and it then becomes necessary to bring the ends of the rubber together and equalize the compression thereof, which is greatest at those portions of the tire lying immediately adjacent to the joint. For this purpose the blades or plates 53 are introduced between the tire and the metallic rim, being sufficiently thin for this purpose, and being arranged in the channel underneath the rubber tire, one back of the other, as clearly shown in Fig. 9. After these blades have been placed in position the base-plate 58 is then clamped to them by means of the clamping-plate 57 and bolts 56, and the lever 61 is so adjusted by means of the screw 63 as to cause the roller 62 to bear upon the outer portion of the rubber tire with the necessary pressure. The wires 66 are then connected to the carriage 32, whereupon by moving the carriage through the mechanism provided for that purpose the entire device may be drawn along around the periphery of the wheel, with the blades 53 lying between the tire and rim and the roller 62 pressing upon the outer portion of the tire. The pull upon the ends of the shanks of the blades is such as to tilt these blades upward with their forward edges raised above the bottom of the rim, and they thereby bear against and take a certain amount of hold upon the rubber of the tire and carry this forward along with them to a certain extent. The roller 62 also acts to carry this raised-up portion of the tire forward and to prevent its slipping backward on the wires. The result is that the compressed portion of the rubber is stretched or carried forward in such a way that the two ends of the tire are brought face to face and the compression of the rubber is equalized at and adjacent to the joint and rendered uniform throughout the entire circumference of the wheel. It will be understood, of course, that the meeting faces of the opposite ends of the tire are supplied with a suitable cement before being thus brought into contact, so as to cause them to firmly adhere, and thus complete the tire.

It will be at once seen that by the use of the mechanism which I have devised no undue strain is placed upon the wires, and the strain is, moreover, uniform throughout the entire circumference of the wheel. Moreover, by the use of my apparatus the compressing of the rubber on the wires is readily effected in a mechanical manner and to any desired extent, while the exact amount of tension upon the wires may be adjusted as desired. The apparatus is also readily adjustable to adapt itself to wheels and tires of varying dimensions, and special provision is made for bringing the rubber back into proper place after the ends of the wires have been joined.

I do not wish to be understood as limiting myself to the precise structure hereinbefore described. It is obvious, for instance, that other means than that shown and described may be employed for imparting a rotary motion to the wheel. It is also obvious that other means for imparting and maintaining a suitable tension upon the wire may be substituted for the mechanism which I have devised for that purpose, although I prefer the form shown, and the wires may be clamped and held in various other ways than by the particular forms of clamping and holding devices set forth. I therefore do not wish to be understood as limiting myself strictly to the precise details of construction hereinbefore described.

I claim—

1. An apparatus for applying vehicle-tires, comprising means for supporting and rotating a vehicle-wheel, means for securing one end of the tire to the rim of the wheel, and a tension device adapted to be connected to the other end of the tire and to maintain a uniform tension thereon during the rotation of the wheel, substantially as described.

2. An apparatus for applying rubber vehicle-tires having retaining-wires, comprising means for supporting and rotating a vehicle-wheel, means for securing one end of the wire or wires to the rim of the wheel, and a tension device adapted to be connected to the other end of the wire or wires and to maintain a uniform tension thereon during the rotation of the wheel, substantially as described.

3. An apparatus for applying rubber vehicle-tires having retaining-wires, comprising means for supporting and rotating a vehicle-wheel, means for securing one end of the wire or wires to the rim of the wheel, a carriage movable toward and from the wheel to which the other end of the wire or wires may be connected, and a stop to engage that end of the rubber tire adjacent to said carriage, whereby when said carriage is moved away from the wheel the rubber is compressed upon the wire or wires, said carriage being adapted when the wheel is rotated in the opposite direction to maintain a uniform tension upon the wire or wires, substantially as described.

4. An apparatus for applying vehicle-tires, comprising means for supporting and rotating a vehicle-wheel, means for securing one end of the tire to the rim of the wheel, and an adjustable tension device adapted to be connected to the other end of the tire and to maintain a uniform tension thereon during the rotation of the wheel, substantially as described.

5. An apparatus for applying rubber vehicle-tires having retaining-wires, comprising means for rotatably supporting a vehicle-wheel, means for securing one end of the wire or wires to the rim of the wheel, a movable carriage to which the other end of the wire or wires may be connected, and a stop to engage that end of the rubber tire adjacent to said carriage, whereby, when said carriage is moved away from the wheel, the rubber is compressed upon the wire or wires, substantially as described.

6. An apparatus for applying vehicle-tires, comprising means for supporting and rotating a vehicle-wheel, means for securing one end of the tire to the rim of the wheel, and a tension device adapted to be connected to the other end of the tire and comprising a guiding and supporting way having a rack, a carriage mounted to slide on said way and having a shaft provided with a pinion to engage the rack, and with a friction-drum, and a friction-band engaging said drum, substantially as described.

7. An apparatus for applying vehicle-tires, comprising means for supporting and rotating a vehicle-wheel, means for securing one end of the tire to the rim of the wheel, and a tension device adapted to be connected to the other end of the tire and comprising a guiding and supporting way having a rack, a carriage mounted to slide on said way and having a shaft provided with a pinion to engage the rack, and with a friction-drum, and a friction-band of adjustable tension engaging said drum, substantially as described.

8. An apparatus for applying vehicle-tires, comprising means for supporting and rotating a vehicle-wheel, means for securing one end of the tire to the rim of the wheel, and a tension device adapted to be connected to the other end of the tire and comprising a guiding and supporting way having a rack, a carriage mounted to slide on said way and having a shaft provided with a pinion to engage the rack, and with a friction-drum, a crank for manually rotating said shaft, a friction-band to coöperate with the friction-drum, and means for releasing and applying said friction-band, substantially as described.

9. An apparatus for applying vehicle-tires, comprising means for supporting and rotating a vehicle-wheel, means for securing one end of the tire to the rim of the wheel, and a tension device comprising a guiding and supporting way arranged in the plane of the vehicle-wheel and having its end adjacent to said wheel vertically adjustable, and a tension-carriage mounted on said way and adapted to be connected to the other end of the tire, substantially as described.

10. In an apparatus for applying vehicle-tires, the combination, with a tension device to which one end of the tire is connected, of means for securing the other end of the tire to the rim of the vehicle-wheel, a stud provided with means for rotatably supporting the vehicle-wheel, a worm-wheel provided with means for engaging and rotating the vehicle-wheel, a shaft provided with a worm to mesh with said worm-wheel, and means for rotating said shaft, substantially as described.

11. In an apparatus of the character described, the combination, with a stud provided with means for rotatably supporting the vehicle-wheel, of a gear having an annular flange against which the vehicle-wheel is seated, and a rod or bar adjustably mounted in said flange and having one of its ends adapted to engage the vehicle-wheel, substantially as described.

12. In an apparatus of the character described, a clamp for connecting the retaining wire or wires to a vehicle-wheel rim, comprising a body portion having means for gripping said wire or wires and extending laterally beyond the rim, eyebolts adapted to slip over the ends of said body portion, a clamping-plate also extending beyond the sides of the rim and apertured to receive the ends of the eyebolts, and clamping-nuts mounted on the ends of the eyebolts beyond said clamping-plate, substantially as described.

13. In an apparatus of the character described, means for moving the rubber tire relatively to the retaining wire or wires after these latter have been joined and are in the rim, comprising one or more thin flat plates or blades adapted to be inserted under the tire between it and the rim and having external shanks or stems whereby they may be moved, a plate to which said shanks or stems are connected, and an adjustable lever pivoted on said plate and provided with a roller to bear upon the outermost portion of the tire back of said plates, substantially as described.

14. In an apparatus of the character described, means for moving the rubber tire relatively to the retaining wire or wires after these latter have been joined and are in the rim, comprising two thin flat plates or blades adapted to be inserted under the tire between it and the rim and having external slotted shanks or stems, a base-plate provided with clamping devices whereby said shanks or stems may be secured thereto after engagement under the tire, a lever pivoted on said base-plate and provided with a roller to bear upon the outer portion of the tire in the rear of said plates, and means for adjusting said lever to vary the position and pressure of said roller, substantially as described.

15. In an apparatus of the character described, the combination, with means for supporting a vehicle-wheel, a guideway, a carriage movable on said guideway, and means for operating said carriage, of means for moving the rubber tire relatively to the retaining wire or wires after these latter have been joined and are in the rim, comprising one or more thin flat plates or blades adapted to be inserted under the tire between it and the rim, a roller to press upon the outer part of the tire in the rear of said blade or blades, and connecting devices adapted to be secured to the carriage, substantially as described.

16. In an apparatus of the character described, means for moving the rubber tire relatively to the retaining wire or wires after these latter have been joined and are in the rim, comprising one or more thin flat plates or blades adapted to be inserted under the tire between it and the rim, a supporting-plate to which the shanks of said blades are connected, and actuating means connected to the lower portion of said shanks so as to tilt said blades and move them longitudinally of the rim with their forward edges above the bottom thereof, substantially as described.

17. In an apparatus of the character described, means for moving the rubber tire relatively to the retaining wire or wires after these latter have been joined and are in the rim, comprising one or more thin flat plates or blades adapted to be inserted under the tire between it and the rim, a supporting-plate to which the shanks of said blades are connected, an arm carried by said supporting-plate and adapted to press upon the outer portion of the tire in the rear of the blades, and actuating means connected to the lower portion of said shanks so as to tilt said blades and move them longitudinally of the rim with their forward edges above the bottom thereof, substantially as described.

BENJAMIN F. KENNA.

Witnesses:
FREDERICK C. GOODWIN,
LOUIS T. MANN.